United States Patent Office 3,515,559

Patented June 2, 1970

3,515,559

DRY PROCESS PROOF SHEET COMPOSITION

Leonard J. Druker and Leonard Wayne Sachi, St. Paul, Minn., assignors to Minnesota Mining and Manufacturing Company, St. Paul, Minn., a corporation of Delaware No Drawing. Filed Sept. 30, 1966, Ser. No. 583,432
Int. Cl. G03c *1/34*
U.S. Cl. 96—109 8 Claims

ABSTRACT OF THE DISCLOSURE

A proof sheet useful in taking proofs of photographic negatives prior to preparation of lithographic printing plates comprises a light-sensitive heat-developable silver salt composition containing stabilizing amounts of an $\alpha,\beta$-unsaturated condensation product of a cyclic aldehyde with cyclohexanone or cyclopentanone.

This invention relates to the proofing of commercial art work and has particular reference to novel light-sensitive sheet materials and methods of making and using the same.

The invention provides a proof sheet product which can be handled under subdued natural or artificial light, thereby to avoid any necessity for darkroom expense and inconvenience, while still having ample sensitivity when exposed under conventional electric arc light sources. After exposure to the light-pattern, the image is developed on the proof sheet by a simplified technique involving only uniform brief heating and requiring no solutions, fumes, or other developing aids. The resulting proof print shows excellent contrast and detail in the form of sharp black images on a substantially white background, and retains its appearance under considerable additional exposure to room light and other customary viewing and storage conditions.

Proof sheets of this invention find particular application in the proofing of photographic negatives which are to be used in the preparation of lithographic printing plates. The same equipment, e.g. the arc light and vacuum frame equipment, used in exposing the sensitized lithographic plate is also ideal for exposing the proof sheet. Exposure and development require only a minimum of time, completed proofs being regularly prepared in from one to three minutes, so that inspection of the proof may be accomplished without delay and the negative returned for immediate correction or forwarded for immediate preparation of the final plate. The process is completely dry, thus avoided the dimensional changes incurred during conventional wet processing.

Reduction of light-sensitivity of photographic elements to produce plates or films capable of being safely handled under normal room lighting has previously been described. In U.S. Pat. No. 3,237,008, for example, X-ray films are provided with an outer light-blocking layer containing a yellow dye which absorbs the visible radiation to which the photographic coating is otherwise sensitive while permitting passage of X-rays. The intensely yellow dye protects the emulsion during loading and processing, but is dissolved and removed during the final wet processing steps and after development of the latent image.

The proof sheets of the present invention need undergo no wet processing after exposure, and any added dyes must therefore remain in the coating. Such proof sheets, if made resistant to room light by the prior art techniques just described, would therefore remain highly colored in the non-image areas. Intense color in the background makes the imaged proof sheet difficult to inspect and such products are generally not commercially acceptable.

The present invention makes possible the preparation of proof sheets which may be safely handled under normal room lighting without fogging under subsequent treatment. When suitably exposed under an arc light or equivalent high-energy source and then heated, the sheet provides a visible record of the exposure in the form of black images on a white or substantially white background. The record produced is substantially permanent, the image areas remaining at full initial density and the non-image areas showing little or no darkening under protracted aging.

The effect described is obtained, in accordance with the present invention, by the incorporation, in a light-sensitive and heat-developable silver salt composition, of not more than about three or in some cases four percent, based on the total weight of silver, of active stabilizer materials identified as yellow, crystalline, $\alpha,\beta$-unsaturated, solid, sulfur-free condensation products of cyclohexanone or cyclopentanone with cyclic aldehydes and which are soluble in volatile organic liquid solvents. Surprisingly, these materials are found to provide fully adequate protection at low concentration levels at which their yellow color is scarcely if at all detectable, so that the initially white non-image areas remain white in the developed proof print.

A typical and presently preferred active stabilizer material is the compound 2-pyridilidine cyclohexanone having the structural formula

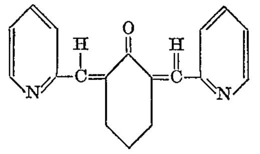

The compound is prepared, by condensation at 50–55° C., from a mixture of 2-pyridine carboxaldehyde and cyclohexanone in anhydrous ethanol and in the presence of a basic catalyst. It precipitates from the ethanol on cooling, and is recovered as yellow water-insoluble crystals melting at 126° C.

Another stabilizer material, equally effective for the purposes of this invention, is cinnamylidine cyclohexanone having the structure

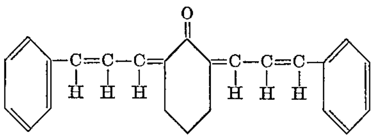

It is similarly prepared from cinnamaldehyde and cyclohexanone, and recovered as yellow water-insoluble crystals melting at 186° C.

Additional stabilizers which are effective in low concentration, without imparting undesirable color and without affecting the image-forming reaction, include the following:

| | M.P. |
|---|---|
| 2-pyridilidene cyclopentanone | 186–189 |
| 3-pyridilidene cyclohexanone | 145–147 |
| 4-pyridilidene cyclohexanone | >300 |

Many compounds are known which have analogous structure and in many instances do indeed provide stabilization of the light-sensitive silver salt composition against normal room light, but which for any of several reasons are not suitable in the practice of the present invention. As examples may be noted: cinnamal acetophenone, M.P. 161–162; p-dimethylaminobenzilidine acetophenone, M.P. 110–112; 2-cinnamylidine pyruvic acid, M.P. 139–142; and cinnamylidine acetone, M.P. 147–148; all of which in useful concentration introduce excessive color; 2-thiophenylidine cyclohexanone, M.P. 155–156, some of the sulfur content of which exerts an undesirable activation effect on the silver salt composition; and the sodium salt of 2-cinnamylidine pyruvic acid, which is insoluble in such volatile organic vehicles as toluene, acetone and methanol from which the compositions are ordinarily applied and in which at least the film-forming binder materials are soluble.

Light-sensitive and heat-developable silver salt compositions are known to the art, and may be prepared for example in accordance with the teachings of U.S. application Ser. No. 362,928 filed Apr. 27, 1964 the subject matter of which is incorporated in U.S. Pat. No. 3,457,-075 issued July 22, 1969. In addition to the light-sensitive and image-forming reactant components, these compositions will ordinarily contain resinous or polymeric film-forming binder materials and may also contain various pigments, fillers, and other additives. They are most conveniently applied to paper or other dimensionally stable thin flexible substrates or carrier webs from solution or suspension in volatile liquid organic solvents in which at least the binder and the stabilizer are soluble, so that the small amount of stabilizer is well distributed throughout the final dried coating.

The light-sensitive heat-developable silver salt layer may be applied as a single coating but is preferably formed of two separate coatings as will hereinafter be further described. In the latter case the stabilizer material may be incorporated in either the first or second coating. When the coatings are formulated as hereinafter illustrated, significantly increased stabilizing efficiency is obtained by incorporating the stabilizer in the second or outer coating, thereby making possible the use of reduced amounts of that material; but at the same time any discoloring effect of the yellow maerial is intensified. In general the amount of stabilizer required to obtain the desired handling properties is found to be not greater than about three percent based on the total weight of silver in the light-sensitive heat-developable silver salt coating. The concentration of stabilizer required when introduced in the surface coating is usually not more than half of that required in the inner coating for equivalent effectiveness. A more restricted and preferred upper limit of concentration for the active stabilizer material is in the neighborhood of one percent by weight of silver. Mixtures of stabilizers are also useful.

An illustrative example, in which all proportions are given in parts by weight, follows.

A first coating mixture is prepared by mixing together

| | Parts |
|---|---|
| Polyvinyl butyral | 7.6 |
| Zinc oxide | 15.5 |
| Silver half soap | 8.9 |
| Toluene | 23.5 |
| Acetone | 44.5 |
| 2-pyridilidine cyclohexanone | 0.03 |

The silver half soap is obtained by precipitation with acidic silver nitrate from an equeous solution of water-soluble sodium salt of commercial behenic acid. It contains equal mol proportions of silver behenate and behenic acid. The binder, pigment and silver salt mixture is uniformly blended in the solvent mixture by prolonged mixing in a ball mill; the stabilizer is added during the final period of milling.

The fluid composition is coated smoothly on the smooth surface of supercalendered white paper at a coating weight, after drying, of 1.4 grams/sq. ft.

| A second coating composition contains | Parts |
|---|---|
| Polyvinyl pyrrolidone | 4 |
| Hydroquinone | 6 |
| Ammonium bromide | 0.06 |
| Succinic acid | 0.05 |
| Methanol | 89.9 |

The solution is uniformly applied over the silver-coated surface at a coating weight, after drying, of 0.2 gm./sq. ft.

The resulting sheet may be temporarily exposed to normal room lighting, for example in handling the sheet preparatory to explosing and developing, without deterioration. A portion is exposed, through a photographic negative in contact with the coated surface, to radiation from a 140-ampere arc lamp at a distance of four feet for one minute, the sheet meanwhile being held at room temperature. It is then passed over a heated platen maintained at 195° F., the uncoated surface contacting the platen for ten seconds. The exposed areas are blackened; the unexposed areas remain white. A sharp and clear positive print of the photographic negative is obtained.

In a modification of the foregoing, the stabilizer is omitted from the first coat, being replaced by 0.02 part of the same compound in the second coat composition, with equal effectiveness.

In the absence of the stabilizer, sheet materials prepared as above described are extremely light-sensitive and must be handled only under safelight or darkroom conditions; and they produce a dense black image on a white background when exposed under the arc lamp for less than one second followed by heating.

What is claimed is as follows:

1. A light-sensitive heat-developable sheet material which may be safely handled under normal room lighting conditions and then imaged by exposure to radiation from an electric arc followed by brief heating to provide a black image at exposed areas and a substantially white background at unexposed areas, and which is useful in the proofing of commercial art work; said sheet including a normally light-sensitive heat-developable coating containing a light-stable organic silver salt and an organic reducing agent, together with a catalytic amount of photosensitive silver halide; and said coating additionally containing uniformly laterally dispersed therein an $\alpha,\beta$-unsaturated sulfur-free yellow crystalline soluble solid condensation product of a cyclic aldehyde and cyclohexanone or cyclopentanone.

2. A sheet material as defined in claim 1 wherein said condensation product is present in a concentration not greater than about one percent.

3. A sheet material as defined in claim 1 wherein said condensation product is 2-pyridilidene cyclohexanone.

4. A sheet material as defined in claim 1 wherein said condensation product is cinnamylidene cyclohexanone.

5. A sheet material as defined in cyaim 1 wherein said condensation product is 2-pyridilidene cyclopentanone.

6. A sheet material as defined in claim 1 wherein said condensation product is 3-pyridilidene cyclohexanone.

7. A sheet material as defined in claim 1 wherein said condensation product is 4-pyridilidene cyclohexanone.

8. The sheet material of claim 1 wherein the cyclic aldehyde is 2-pyridine carboxaldehyde or cinnamaldehyde.

References Cited

UNITED STATES PATENTS

| | | | |
|---|---|---|---|
| 3,080,254 | 3/1963 | Grant | 117—36.8 |
| 3,237,008 | 2/1966 | Dostes et al. | 96—84 X |

NORMAN G. TORCHIN, Primary Examiner

A. T. SURO PICO, Assistant Examiner

U.S. Cl. X.R.

96—114.1